United States Patent [19]

Crewson et al.

[11] Patent Number: 5,350,043
[45] Date of Patent: Sep. 27, 1994

[54] AUTOMATIC SLACK ADJUSTER

[75] Inventors: Gary Crewson, Orchard Park, N.Y.;
Darryl F. Dimond, Niagara Falls, Canada

[73] Assignee: Crewson Brunner Inc., Buffalo, N.Y.

[21] Appl. No.: 26,823

[22] Filed: Mar. 5, 1993

[51] Int. Cl.⁵ ............................................. F16D 65/38
[52] U.S. Cl. ............... 188/79.55; 188/196 BA; 188/196 V
[58] Field of Search ............ 188/79.55, 71.9, 196 BA, 188/196 B, 196 D, 196 V; 192/111 A, 46, 108

[56] References Cited

U.S. PATENT DOCUMENTS

| | | | |
|---|---|---|---|
| 3,997,036 | 12/1976 | Zeidler | 188/79.55 |
| 4,114,733 | 9/1978 | Knight | 188/79.55 X |
| 4,380,276 | 4/1983 | Sweet et al. | 188/79.55 |
| 4,440,268 | 4/1984 | Karlsson | 188/79.55 |
| 4,621,714 | 11/1986 | Skurka | 188/79.55 X |

*Primary Examiner*—Robert J. Oberleitner
*Assistant Examiner*—Lee W. Young
*Attorney, Agent, or Firm*—Bean, Kauffman & Spencer

[57] ABSTRACT

An automatic slack adjuster operating to effect reduction of slack present in a vehicle brake system upon brake release incorporates a member cooperating with a slack adjusting rotor to determine a reference position for the rotor and to return the rotor to such reference position at the completion of each brake operational cycle.

9 Claims, 2 Drawing Sheets

FIG. 4
FIG. 5
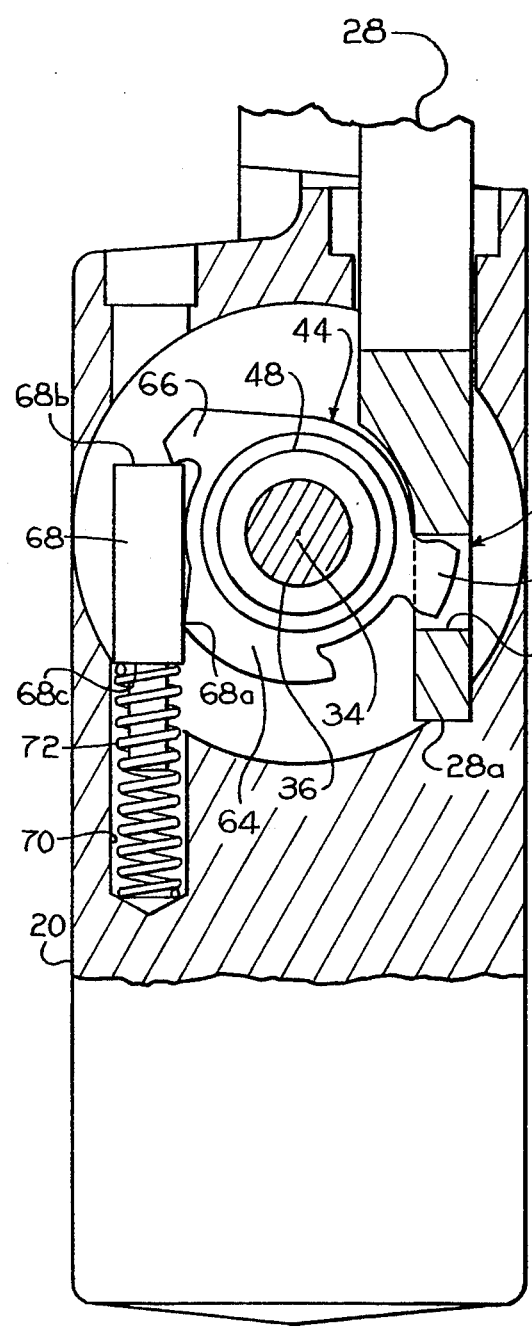
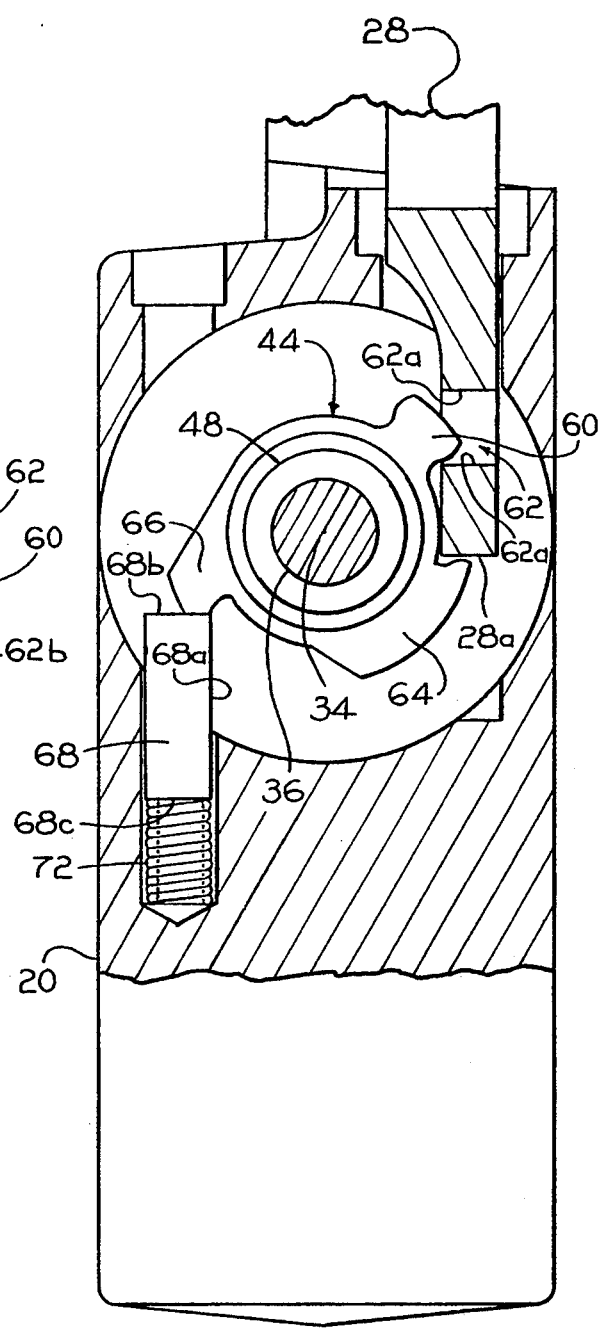

AUTOMATIC SLACK ADJUSTER

BACKGROUND OF THE INVENTION

It is known to provide an automatic slack adjuster for operably connecting a brake operator to a cam shaft forming part of a vehicle brake system of the type including a housing; a worm gear mounted by the housing for rotation with the cam shaft about a first axis; a worm shaft mounted by the housing to rotate about a second axis perpendicular to the first axis and for displacement axially of the second axis, wherein the worm shaft has opposite ends and a worm arranged intermediate such ends for engagement with the worm gear; a rotor and a coupling each mounted coaxially to rotate relative to one end of the worm shaft; a clevis for connecting the housing to the brake operator for rotating the housing in opposite directions about the first axis as the vehicle brakes are applied and released; a link for connecting the clevis to the rotor for rotating the rotor in opposite directions about the second axis as the vehicle brakes are applied and released; a one way clutch tending to couple the coupling for rotation with the rotor when the rotor is rotated in one direction and tending to uncouple the coupling from rotation with the rotor when the rotor is rotated in an opposite direction; a slip device for releasably connecting the worm shaft for rotation with the coupling; and a spring tending to bias the worm shaft axially to rotatably connect the worm shaft to the coupling via the slip device, while permitting oppositely directed axial movement of the worm shaft to rotationally disconnect the worm shaft from the coupling upon a given axial loading of the worm shaft by the cam shaft.

Slack adjusters of the type generally described above are of two general types, namely, a first type wherein slack adjustments are effected during brake application, as disclosed for example in U.S. Pat. No. 4,380,276, and a second type wherein slack adjusters are effected during brake release, as disclosed for example in U.S. Pat. No. 3,351,163.

SUMMARY OF INVENTION

The present invention is directed to an improvement adapted for use in automatic slack adjusters of the general type described above.

More specifically, the improvement of the present invention is directed to the provision of a member mounted by the housing of a slack adjuster, which is wholly separated from the rotor operating link and cooperates with the rotor to define a reference position to be occupied by the rotor coincident with an end condition of an operational cycle of the slack adjuster, and a return spring tending to bias the rotor for return to such reference position.

A preferred form of the invention is disclosed for use in an automatic slack adjuster of the type adapted to effect slack adjustment during brake release. Specifically, the member is disclosed as being in the form of a pin mounted by the housing of the slack adjuster for reciprocating movement under the control of the return spring, wherein the member has a side surface aligned with its direction of movement and arranged for engagement by a first abutment carried by the rotor to define the reference position, a first end surface arranged to be engaged by a second abutment carried by the rotor and a second end surface arranged for engagement with the return spring. Upon rotation of the rotor under control of the link in a direction away from its reference position, as an incident to application of the vehicle brakes, engagement of the second abutment with the first end of the member effects movement of the member for purposes of compressing the return spring. Upper release of the vehicle brakes, the return spring biases the rotor for return to its reference position.

The provision of a reference position for the rotor in the manner described provides for very accurate brake running clearance over a wide range of brake operating conditions.

An additional feature of the invention is to provide an automatic slack adjuster of the type described with means to insure that the coupling is wholly disconnected from the worm shaft when the latter is subjected to axial loading sufficient to initiate axial movement thereof against its spring bias in order to prevent wearing away of the slip devise during use.

BRIEF DESCRIPTION OF THE DRAWINGS

The nature and mode of operation of the present invention will now be more fully described in the following detailed description taken with the accompanying drawings wherein:

FIG. 4 is a sectional view taken generally along the line 4—4 in FIG. 2 and showing the rotor of the slack adjuster in its brake release or first reference position; and FIG. 5 is a view similar to FIG. 4, but showing the rotor in a brake applied position.

DETAILED DESCRIPTION

Figure 1:
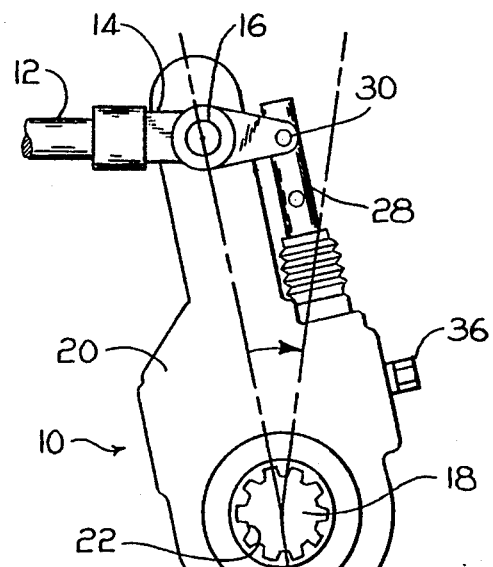
FIG. 1 is a side elevational view of a slack adjuster incorporating the present invention and showing its connection with portions of a brake operator and vehicle braking system.

Reference is first made to FIG. 1, wherein an automatic slack adjuster incorporating the present invention is generally designated as 10 and shown as being connected to an operator shaft 12 of a known brake operating system via an operator shaft mounted clevis 14 and pivot pin 16 and to a cam shaft 18 of a known vehicle brake system.

Slack adjuster 10 includes an elongated housing 20 having a bore opening adjacent one end for receiving pivot pin 16 and a bore opening adjacent an opposite end for rotatably supporting a worm gear 22, which is suitably keyed to cam shaft 18, as by a spline connection 24, for rotation about a first axis 26. Slack adjuster 10 is also connected to clevis 14 via a link 28, which is slidably supported by housing 20 and has a protruding end pivotally connected to the clevis by a pivot pin 30.

Figure 3:
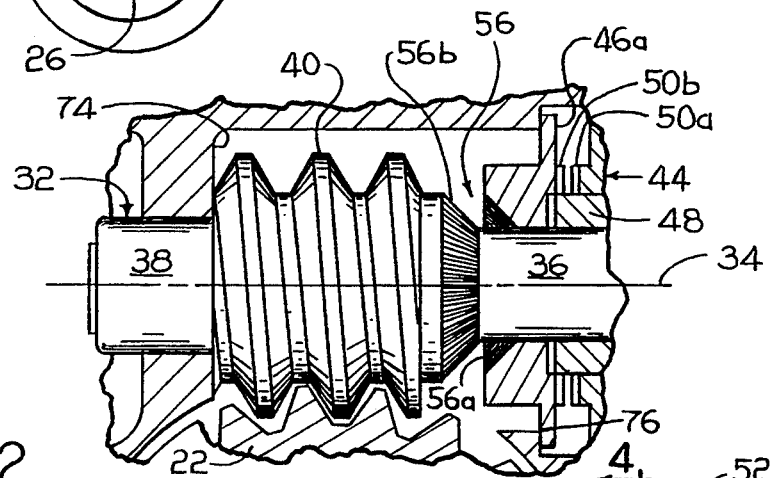
FIG. 3 is a view similar to FIG. 2, but showing axial displacement of its worm shaft under brake operating conditions.
Figure 2:
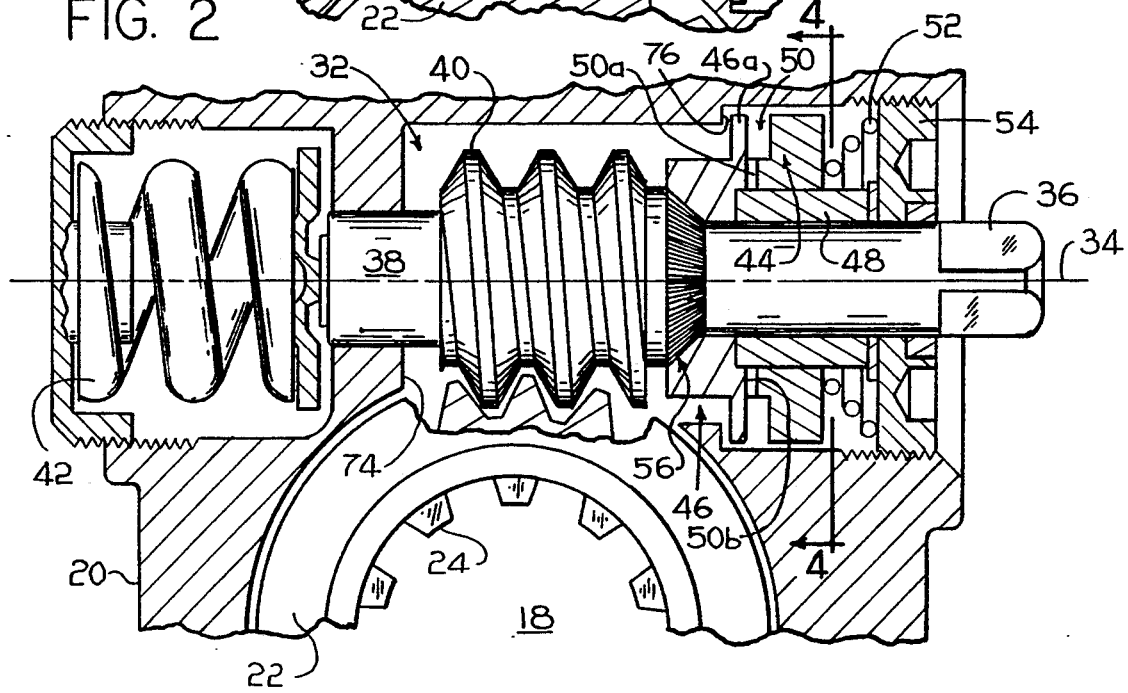
FIG. 2 is an enlarged fragmentary sectional view of the slack adjuster with a portion of its housing removed.

Now referring to FIGS. 2 and 3, it will be understood that housing 20 also serves to mount a worm shaft 32 for rotation about a second axis 34, which is disposed perpendicular to first axis 26, and for displacement axially of the second axis in first and second axial directions alternatively into first and second positions shown in FIGS. 2 and 3, respectively. Worm shaft 32 includes first and second ends 36 and 38, and a worm 40 disposed intermediate such ends and arranged to engage with worm gear 22. A suitable compression spring 42 is carried within housing 20 for engagement with second end 38 of worm shaft 32 and tends to oppose movement of the worm shaft in the second axial direction away from its first position shown in FIG. 2 under loading applied to worm 40 by worm gear 22, during operation of the vehicle brakes.

After initial mounting of slack adjuster 10, desired adjustments of the rotatable position of cam shaft 18 relative to housing 20 may be effected manually by the application of a tool to the free end portion of first end 36 of worm shaft 32, which is shown in FIGS. 1-3 as projecting outwardly of the housing.

First end 36 of worm shaft 32 serves to freely rotatably mount a rotor 44 and a coupling 46 via a bearing sleeve 48. Rotor 44 is coupled to coupling 46 by a suitable one way clutch 50, such as may be defined by ratchet teeth 50a and 50b arranged on facing end surfaces of the rotor and coupling, respectively, with a suitable spring 52 being arranged between the rotor and an end plug 54 for biasing teeth 50a into engagement with teeth 50b. Teeth 50a and 50b are shaped and arranged to permit uncoupling, or rotation of rotor 44 relative to coupling 46 when the rotor is driven for rotation about second axis 34 in a first direction, i.e. counterclockwise from a reference position shown in FIG. 4, and to permit the coupling to driven for rotation with the rotor when the rotor is driven for rotation in a second direction, i.e. clockwise from an intermediate position shown in FIG. 5 for return to its reference position.

Coupling 46 is also releasably connected or coupled for rotation with worm shaft 32 by a slip means 56, such as may be defined by shallow grooves and teeth 56a and 56b arranged on facing, frusto-conical surfaces of coupling 46 and first end 36 of worm shaft 32. Thus, it will be understood that compression spring 42 tends to bias worm shaft 32 for movement in its first axial direction into its first position shown in FIG. 2, wherein grooves and teeth 56a and 56b engage and connect coupling 46 for rotation with the worm shaft. Coupling 46 is preferably formed with a radially outwardly extending abutment or motion limiting flange 46a whose purpose will be hereinafter described.

In accordance with a preferred form of the present invention, rotor 44 is movably coupled to link 28 by providing the rotor with a radially outwardly projecting lug 60 arranged to be loosely received with a recess 62 defined by the link and bounded by spaced, upper or first and lower or second surfaces 62a and 62b, respectively. Rotor 44 is also provided with radially outwardly projecting first and second abutments 64 and 66, which are arranged for operable engagement with a member 68 supported for reciprocating movement within a recess 70 defined by housing 20 under the control of a return spring, which is preferably in the form of a coil type compression spring 72. Specifically, member 68 is preferably in the form of a cylindrically shaped pin having a side surface, which defines a first abutment surface 68a disposed in alignment with the direction of its reciprocating movement, and oppositely facing end surfaces, which define second and third abutment surfaces 68b and 68c, respectively, spaced apart in such direction of movement. First abutment surface 68a is arranged to be engaged by first abutment 64 to define the reference position of rotor 44 shown in FIG. 4, second abutment surface 68b is arranged for engagement by second abutment 66, and third abutment surface 68c is arranged for engagement by return spring 72.

In operation, slack adjuster 10 normally assumes an initial position shown in FIG. 1, wherein the brakes of a vehicle are fully released. In this initial position of the slack adjuster, teeth 50a and 50b of one way clutch 50 are engaged, and grooves and teeth 56a and 56b of slip means 56 are engaged as shown in FIG. 2; and link 28 occupies an initial contracted position within housing 20 and rotor 44 occupies its reference position, as shown in FIG. 4, wherein first abutment 64 is engaged with first abutment surface 68a, return spring 72 is partially extended and maintains second abutment surface 68b in under engagement second abutment 66, and lug 60 is disposed slightly above lower recess surface 62b of the link.

Upon application of braking force to the brake operating system, operator shaft 12 is forced to move to the right, as viewed in FIG. 1, and thereby cause housing 20 and worm gear 22 to rotate about first axis 26 through some angle $\theta$ until cam shaft 18 has been rotated sufficiently to fully apply the brakes of a vehicle. As an incident to rotation of housing 20 through angle $\theta$, link 28 is partially withdrawn from within housing 20, due to its pivot connection with clevis 14, until it assumes an extended position shown generally in FIG. 5. As link 28 is extended, lower recess surface 62b first engages lug 60 and then lifts the lug to thereby impart counterclockwise directed rotation to rotor 44, as viewed in FIG. 4, until the rotor is moved into its intermediate position shown generally in FIG. 5 coincident with the arrival of the link in its extended position. As rotor 44 is rotated from its reference position into its intermediate position, spring 52 permits the rotor to ratchet relative to coupling 46, and return spring 72 is further compressed as member 68 is forced to slide within recess 70, due to engagement of second abutment 66 with second abutment surface 68b.

During the whole of the braking operation, worm shaft 32 tends to remain fixed against rotation about second axis 34, and thus worm gear 22 remains essentially rotationally fixed relative to housing 20, such that both the worm gear and cam shaft 18 are rotated through the angel $\theta$ for brake application purposes. On the other hand, as braking force is applied, worm shaft 32 tends to move towards the left, as viewed in FIG. 2, against the bias of spring 42, due to the axial reaction force created between worm gear 22 and worm 40. As long as this braking force is below a certain limit, spring 42 will not yield, but when such force overcomes the preload of the spring, worm shaft 32 will be axially displaced until arrested by suitable means, such as by engagement of worm 40 with an annular abutment surface 74 defined by housing 20, as shown in FIG. 3. Upon displacement of worm shaft 32 in this manner, grooves and teeth 56a and 56b tend to become disengaged, such that coupling 46 is free to rotate relative to worm shaft 32.

In order to insure complete disengagement of grooves and teeth 56a and 56b incident to axial displacement of worm shaft 32 against the bias of spring 42, there is provided restraining means in the form of a second abutment surface 76 on housing 20, which is arranged for engagement by flange 46a of coupling 46 and is adapted to limit worm shaft following movement of the coupling to the left, as viewed in FIG. 3, under the bias of spring 52. Alternatively, the above restraining means may be a compression spring, not shown, arranged axially intermediate worm 40 and coupling 46 to effect disengagement of grooves and teeth 56a and 56b upon initiation of displacement of worm shaft 32 against the bias of spring 42. Such compression spring would necessarily exert a greater spring force than spring 52 and a lesser spring force than spring 42. In either arrangement, wear of grooves and teeth 56a and 56b induced by relative rotational movement thereof while in partially engaged condition is alleviated.

Upon release of braking force on the brake operating system, operator shaft 12 is retracted until housing 20 is rotated counterclockwise through angle θ for return to its initial position shown in FIG. 1, and coincident therewith link 28 is forced to return to its initial contracted position shown in FIG. 4. As link 28 moves towards its initial position, return spring 72 operating through member 68, biases rotor 44 for rotation in a clockwise direction for return to its reference position viewed in FIG. 4. The speed of this clockwise rotation of rotor 44 is limited by the speed at which link 28 is returned to its initial position, since return spring 72 tends to maintain lug 60 in following engagement with link lower surface 62b. Further, during rotation of rotor 44 towards its reference position, coupling 46 is coupled for rotation with the rotor, due to the presence of one way clutch 50. However, coupling 46 remains uncoupled form worm shaft 32, until such time as axial loading of the worm shaft decreases sufficiently to permit compression spring 42 to force the worm shaft to the right as viewed in FIG. 3 for purposes of reengaging slip means 56. If re-engagement of slip means 56 does not occur until substantially coincident with the return of rotor 44 to its reference position, no rotational movement will be imparted to worm shaft by the rotor, during the brake operational cycle, and, thus, no adjustment of the vehicle brakes will occur during such cycle and the brakes will remain in properly adjusted condition. On the other hand, if positive re-engagement of slip means 56 should occur before return of rotor 44 to its reference position, rotor 44 will be operable to drive worm shaft 32 for rotation in a clockwise direction, as viewed in FIG. 5, with the result that worm 40 will drive worm gear 22 and thus rotate cam shaft 18 for rotation relative to housing 20 to take up slack existing in the vehicle brake system. After any such slack adjustment, no further rotation of cam shaft 18 relative to housing 20 will occur during subsequent brake operational cycles, until a subsequent slack condition occurs, due for instance to the further wearing away of brake pads incorporated in the vehicle brake system.

When slack adjuster 10 is initially installed without care being exercised to properly adjust the initial rotatable position of cam shaft 18 relative to housing 20, via manipulation of the projecting free end 36 of worm shaft 32, the loading applied to the worm shaft, during initial brake operational cycles, may be insufficient to effect axial displacement of the worm shaft, such that rotor 44 will be drivingly coupled to cam shaft 18 during all or a substantial portion of rotational movement of the rotor from its intermediate position towards its reference position. If this should occur, the force of return spring 72 may be insufficient to timely initiate driven rotation of rotor 44 for return to its reference position in the manner contemplated for the case where only slight adjustment of slack is required incident to normal brake usage. This potential problem is elevated by shaping first abutment 64 such that it is arranged to underlie the inner or lower end surface 28a of link 28, when the link is disposed in its extended position and rotor 44 is disposed in its intermediate position shown in FIG. 5. Thus, when return movement of link 28 is initiated, inner end surface 28a will engage with abutment 64 and positively initiate return rotational movement of rotor 44 at least until lug 60 is fully inserted within slot 62 and arranged for underlying driven engagement by slot upper end 62a, if required. Depending on the degree of initial slack existing in the system, one or more brake operational cycles may be required before cam shaft 18 is properly positioned relative to housing 20, but thereafter, the operational cycle of the present brake adjuster will be as described above.

While the construction specifically disclosed above is preferred, it is contemplated that various modifications therein may be made without departing from the present invention. As by way of example, it is contemplated that ratchet type one way clutch 50 may be replaced by a spring type one way clutch and groove and teeth type slip means 56 may be replaced by suitable friction surfaces, shown for example in U.S. Pat. No. 3,351,163.

What is claimed is:

1. In a slack adjuster for connecting a brake operator to rotate a cam shaft of a vehicle brake system of the type including a housing; a worm gear mounted by said housing for rotation with said cam shaft about a first axis; a worm shaft mounted by said housing to rotate about a second axis perpendicular to said first axis and for displacement axially of said second axis in first and second axial directions, said worm shaft having opposite ends and a worm intermediate said ends engaged with said worm gear; a rotor and a coupling each mounted coaxially to rotate relative to one of said ends of said worm shaft; connecting means connecting said housing to said brake operator for rotating said housing about said first axis as vehicle brakes are applied and released; a link connected to said connection means and said rotor for rotating said rotor in a first direction as said vehicle brakes are applied and in a second direction as said vehicle brakes are released; one way clutch means tending to couple said coupling for rotation with said rotor when said rotor is rotated in said second direction and tending to uncouple said coupling from rotation with said rotor when said rotor is rotated in said first direction; slip means for releasably connecting said coupling to said worm shaft for rotation therewith; spring means tending to bias said worm shaft against movement in said second axial direction from rotational coupling engagement with said coupling via said slip means, said spring means permitting movement of said worm shaft in said second axial direction to uncouple said coupling from rotation with said worm shaft via said slip means upon a given axial loading of said worm shaft incident to operation of said vehicle brakes, the improvement comprising in combination:

means for defining a first reference position of said rotor and a return spring for biasing said rotor for rotation in said second direction into said first reference position.

2. The improvement of claim 1, wherein said means for defining said first reference position includes a first abutment carried by said rotor and a first abutment surface carried by said housing for engagement by said first abutment to define said first reference position.

3. The improvement of claim 1, wherein said return spring is a compression spring carried by said housing, and said rotor carries an abutment for compressing said compression spring incident to rotation of said rotor in said first direction.

4. The improvement of claim 1, wherein said means for defining said first reference position includes a first abutment carried by said rotor and a member movably supported by said housing and having a first abutment surface arranged for engagement by said first abutment to define said first reference position, said member has a second abutment surface, said rotor carries a second abutment arranged to engage with said second abutment surface to effect movement of said member relative to said housing incident to rotation of said rotor in said first direction and said return spring resiliently opposes said movement of said member relative to said housing.

5. The improvement of claim 1, wherein said link is supported by said housing for reciprocating movement and has a recess; said rotor has a lug receivably within said recess for coupling said rotor to said link for rotational movement incident to reciprocating movement of said link, a first abutment and a second abutment; said housing supports a member for reciprocating movement, said member defining a first abutment surface generally aligned with the direction of said reciprocating movement thereof and oppositely facing second and third abutment surfaces spaced apart along said direction of said reciprocating movement, said first abutment surface is arranged to be engaged by said first abutment to form said means defining said first reference position, said second abutment surface is arranged for engagement by said second abutment and said third abutment surface is arranged for engagement with said return spring; and said return spring is compression spring.

6. The improvement according to claim 1, wherein restraining means is provided to limit movement of said coupling with said worm shaft in said second axial direction to insure uncoupling said coupling from said worm shaft via said slip means upon said given axial loading of said worm shaft.

7. The improvement according to claim 6, wherein said restraining means includes an abutment surface carried by said housing and a flange carried by said coupling and arranged to engage said abutment surface to restrain movement of said coupling with said worm shaft in said second axial direction.

8. The improvement according to claim 1, wherein said link is supported by said housing for reciprocating movement and has an inner end received within said housing and a recess arranged adjacent said inner end bounded by first and second recess surfaces, said link moving outwardly and inwardly of said housing upon application and release of said vehicle brakes by said brake operator, respectively, said rotor has a lug arranged to be removably received within said recess in alignment with said first and second recess surfaces for coupling said rotor to said link for rotational movement incident to reciprocating movement of said link and a first abutment, said means defining said first reference position includes said first abutment and a first abutment surface carried by said housing for engagement by said first abutment to define said first reference position, said second recess surface being arranged to engage with said lug for rotating said rotor in said first direction towards an intermediate position incident to movement of said link outwardly of said housing, said first abutment being arranged for alignment with said inner end of said link and said lug being removed from alignment with said first recess surface upon movement of said rotor into said intermediate position by said link, whereby upon initiation of movement of said link inwardly of said housing said inner end of said link may initiate rotation of said rotor in said second direction from said intermediate position towards said first reference position to place said lug in alignment with said first recess surface and said first recess surface may thereafter engage with said lug to drive said rotor for rotation in said second direction towards said reference position.

9. The improvement according to claim 8, wherein said rotor additionally has a second abutment, said housing supports a member for reciprocating movement, said member defines said first abutment surface disposed for general alignment with the direction of said movement of said member and oppositely facing second and third abutment surface spaced apart along said direction of movement of said member, said second abutment surface is arranged in engagement with said second abutment and said third abutment surface is arranged in engagement with said return spring, said return spring is a compression spring, and said member is moved to compress said return spring by engagement of said second abutment surface by said second abutment as said rotor is rotated in said first direction.

* * * * *